United States Patent [19]

Rudd

[11] 4,326,583
[45] Apr. 27, 1982

[54] HEAT EXCHANGER PANELS

[75] Inventor: Wallace C. Rudd, New Canaan, Conn.

[73] Assignee: Thermatool Corporation, Stamford, Conn.

[21] Appl. No.: 113,790

[22] Filed: Jan. 21, 1980

[51] Int. Cl.³ .............................................. F28F 1/20
[52] U.S. Cl. .................................. 165/183; 29/157.3 C
[58] Field of Search .............................. 165/171, 183; 29/157.3 C; 113/118 C

[56] References Cited

U.S. PATENT DOCUMENTS

| | | | |
|---|---|---|---|
| 2,347,957 | 5/1944 | McCullough | 165/183 |
| 2,809,276 | 10/1957 | Smith | 165/171 |
| 4,136,272 | 1/1979 | Rudd | 165/183 X |

FOREIGN PATENT DOCUMENTS

| | | | |
|---|---|---|---|
| 2512226 | 1/1976 | Fed. Rep. of Germany | 165/171 |
| 1015904 | 10/1952 | France | 165/183 |
| 1015925 | 10/1952 | France | 165/183 |
| 96136 | 11/1960 | Netherlands | 165/183 |
| 644442 | 10/1950 | United Kingdom | 165/183 |

OTHER PUBLICATIONS

Sunsearch, Inc., Solar Energy Research, copy supplied by Applicant.

*Primary Examiner*—Sheldon J. Richter
*Attorney, Agent, or Firm*—Brooks, Haidt, Haffner & Delahunty

[57] ABSTRACT

A method of removing ripples from the metal sheet portion of a heat exchanger panel element which is manufactured by joining a metal tube to a metal sheet by means of heated and cooled weld metal, and the product of the method. In the method, the sheet is corrugated, after the tube is joined thereto, without stretching the metal of the sheet by more than 2% so that the sheet length with corrugations is substantially equal to the length of the tube joined thereto.

8 Claims, 28 Drawing Figures

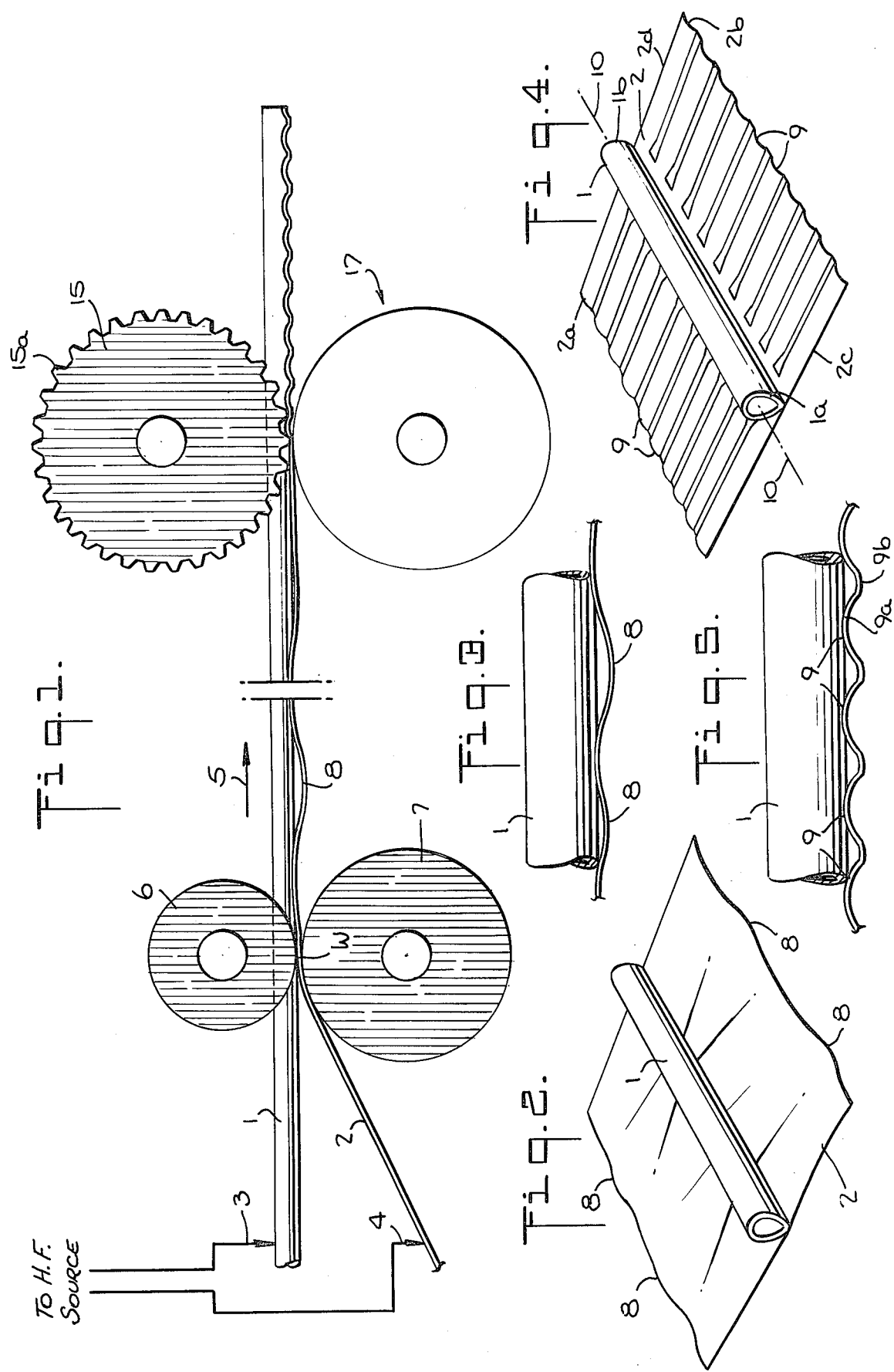

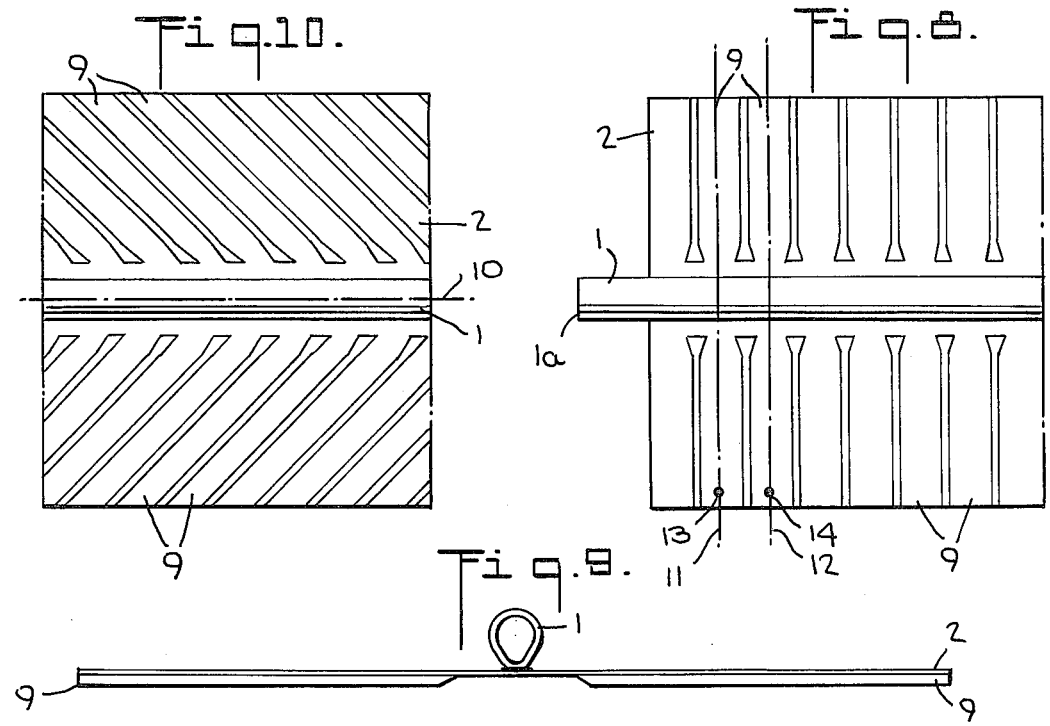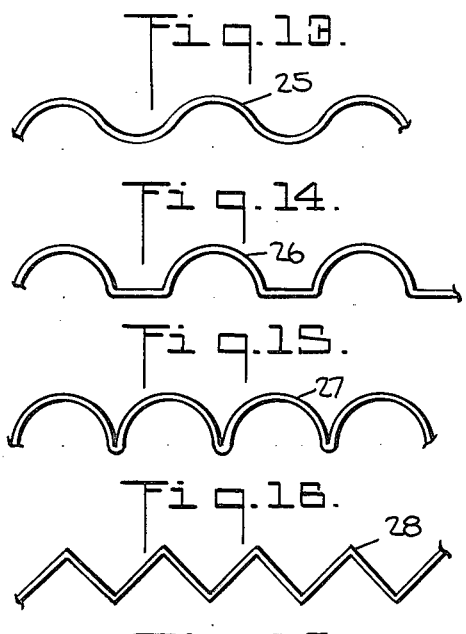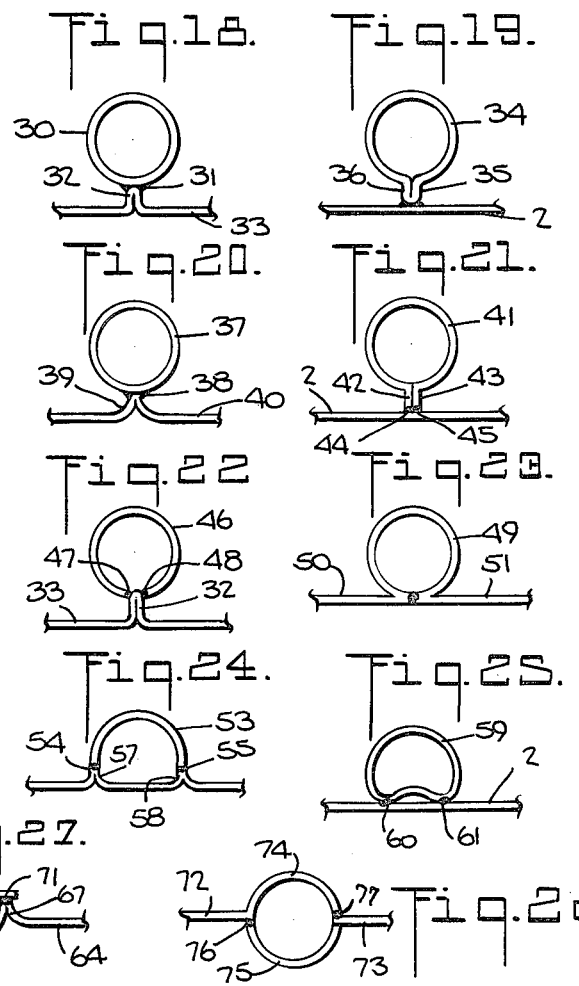

HEAT EXCHANGER PANELS

This invention relates to heat exchanger panels of the type sometimes known as solar panels and which comprise heat absorbing metal sheets having tubing for conveying fluid secured thereto by metal which has been heated and cooled and to a method of manufacturing such panels.

Panels of the type to which the invention relates and the manufacture thereof are illustrated and described in U.S. Pat. No. 4,136,272. In general, panels of such type have metal tubing secured to relatively thin metal sheets or strips by good heat transfer means, such as solder, brazing metal or weld metal. U.S. Pat. No. 4,136,272 describes the use of high frequency welding techniques for joining the tubing and the metal sheet.

The width of the sheet usually is several times the diameter of the tubing. Heat is applied to the tubing and the sheet at their adjacent faces as they are joined together, and when high frequency welding is employed to join them, the temperature is relatively high at such faces. It has been found that while the temperature at such faces is relatively high in the various joining methods, the temperature of the sheets only a short distance from the tubing is much lower and that after the tubing and sheet are joined together and cooled, the shrinkage of the heated metal where the tube and the sheet are joined is such that ripples or buckling occurs in the sheet outwardly of the tubing. Such buckling is random and not only causes the sheet to have an undesirable appearance but also causes gaps between the edges of adjacent sheets when several panels are placed side-by-side as illustrated in U.S. Pat. No. 4,136,272, such gaps also being undesirable from the standpoint of appearance. In addition, the shrinkage may cause the panel to bend transversely to the axis of the tubing which makes it necessary to straighten the tubing before it can be assembled with headers in the manner illustrated in said patent.

Experiments have shown that the shrinkage at the heated area is relatively small even though the buckling effect is quite noticeable. For example, when copper tubing about ⅜ in. outside diameter is welded to copper sheet about four inches wide and 0.010 inches thick using high frequency welding of the type described in said patent, the weld area shrinks about 0.020 inches per foot as compared to the outboard edges of the sheet. Similar copper tubing welded to aluminum sheet of similar dimensions in the same way shrinks about 0.015 inches per linear foot. Thus, the relative shrinkage is in the range of from 0.125% to 0.16%.

One object of the invention is to improve the appearance of heat exchanger panels in a simple and inexpensive manner without adversely affecting the heat exchange properties thereof.

In accordance with the preferred embodiment of the invention, the sheet material at opposite sides of tubing which has been joined by heat with such sheet material is uniformly indented or corrugated along lines extending transversely to the axis of the tubing. The depth and frequency of the corrugations is such that the distance between corresponding points on the corrugations is substantially equal to the length of the portion of the tubing and the weld area which is adjacent thereto. Although the corrugations may taper, that is, have lesser depth nearer the tubing than the depth more remote from the tubing, it is preferred, from the manufacturing standpoint, that the corrugations have a uniform depth. In any case, the metal of the sheet material is stretched during the formation of the corrugations by not more than 2%. In other words, the developed length of the corrugations is no more than about 2% greater than the length of the metal of the sheet prior to corrugation thereof, and hence, is about 2% plus the shrinkage of the tubing (up to 0.25%) greater than the length of the tubing. Thus, the developed length of the corrugations may be up to 2.25% greater than the length of the tubing, but preferably, it is only 0.5% to 1.5% greater than the length of the tubing.

It has been proposed previously to form the sheet material at the sides of tubing joined to such sheet material to increase the absorptivity of the panel and to avoid work hardening of the sheet material with the expansion and contraction thereof during use of the panel. However, to be effective for such purposes, the depth of any corrugations which may be used to accomplish such objects must be much greater than the corrugations used to accomplish the objects of the present invention, and there must be a relatively great stretching of the sheet material, i.e. many times 2%. Such stretching of the sheet material causes many manufacturing problems such as, restrictions on the hardness of the sheet metal, special forming dies, metal cracking or tearing, etc. Therefore, the present invention is to be distinguished from such prior art proposals.

Other objects and advantages of the present invention will be apparent from the following detailed description of the presently preferred embodiments thereof, which description should be considered in conjunction with the accompanying drawings in which:

FIG. 1 is a diagrammatic, side elevation view illustrating the welding of tubing to a thin strip or sheet and the subsequent corrugation of the strip;

FIG. 2 is an isometric view of a short section of a tube welded to a strip as illustrated in FIG. 1 and prior to corrugation of the strip;

FIG. 3 is an enlarged, side elevation view of a portion of the tube-strip combination illustrated in FIG. 2;

FIG. 4 is an isometric view of the tube-strip combination after corrugation of the strip;

FIG. 5 is an enlarged, side elevation view of a portion of the tube-strip combination illustrated in FIG. 4;

FIG. 8 is a plan view of a portion of a tube-strip combination, the strip of which has been corrugated by the apparatus illustrated in FIGS. 6 and 7.

FIG. 9 is an end elevation view of the tube-strip combination illustrated in FIG. 8;

FIG. 10 is a plan view of a portion of a tube-strip combination illustrating corrugations which extend at an acute angle, rather than perpendicular, to the axis of the tube;

FIGS. 13–17 are side elevation views illustrating various corrugation shapes; and FIGS. 18–28 are end elevation views illustrating various tube-strip combinations to which the principles of the invention may be applied.

Figure 6:
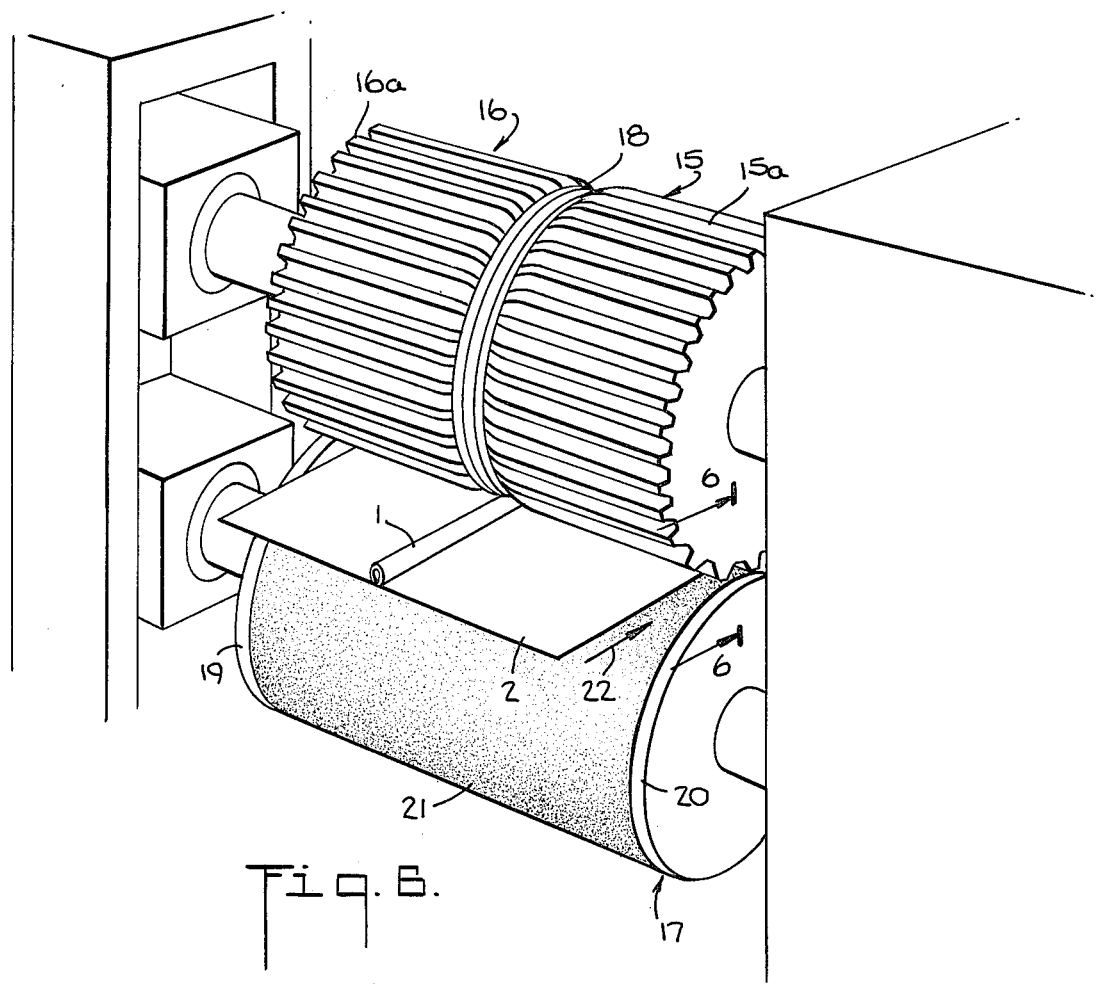
FIG. 6 is a diagrammatic, isometric view of one form of apparatus for corrugating the strip of a tube-strip combination.

The invention will be described in connection with metal tubing substantially continuously welded to a metal strip by the use of high frequency current supplied to the tube and strip in advance of a weld point by means of contacts engaging the tube and the strip in advance of the weld point, but it will be apparent to those skilled in the art that the invention is applicable to tube-strip combinations produced in other ways which involve the use of heated and cooled metal to join the tubing to the strip, such as, for example, joining the tubing to the strip by soldering, brazing, resistance welding, consumable electrode welding, etc., in which the faying surfaces of the tubing and the strip are heated to a higher temperature than portions of the strip spaced laterally of the tubing thereby causing the tubing and the weld metal to shrink in length with respect to the length of such portions of the strip.

The invention may be used in connection with heat exchange elements having various combinations of tube metal and strip metal. For example, the combinations may be as follows:

| TUBE | STRIP |
|---|---|
| copper | copper |
| copper | aluminum |
| copper | carbon steel |
| carbon steel | carbon steel |
| carbon steel | copper |
| stainless steel | stainless steel |
| stainless steel | steel |
| aluminum | aluminum |

FIG. 1 illustrates diagrammatically and in side elevation the welding of a tube 1 to a strip or sheet 2 by supplying high frequency, electric current, e.g. having a frequency of at least 50 Khz and preferably, between 400 Khz and 500 Khz, to a pair of contacts 3 and 4, the contact 3 engaging the tube 1 and the contact 4 engaging the strip 2. The tube 1 and the strip 2 are advanced longitudinally in the direction of the arrow 5 and are pressed together at a weld point W by a pair of rollers 6 and 7, the roller 6 having a peripheral groove which permits the roller 6 to partially embrace the tube 1. Current flows on the facing surfaces of the tube 1 and the strip 2, due to the proximity effect, to and from the contacts 3 and 4. The principal path of the current on the surface of the strip 2 is narrow relative to the width of the surface due to the proximity effect between current flowing the tube 1 and the current at the surface of the strip 2. The tube 1 and the strip 2 approach each other in advance of the weld point W along paths providing a V-shaped gap in advance of the weld point W, and in their passage from the contacts 3 and 4 to the weld point W, the tube 1 and the strip 2 reach welding temperature of their faying surfaces, due to the current flow therein, by the time that they reach the weld point W. After the tube 1 and the strip 2 leave the nip of the rollers 6 and 7, they cool, or are cooled by a cooling fluid, and the tube 1 and the strip 2 have a substantially continuous weld therebetween which is formed by heated and cooled metal of the tube 1 and the strip 2.

As indicated in FIG. 2, the strip 2 is wide relative to the largest cross-sectional dimension of the tube 1, and the tube 1 preferably has a cross-section in the shape of an inverted tear drop so as to aid in concentrating the current along narrow paths in both the tube 1 and the strip 2. The tube 1 may, for example, have a diameter of ⅜ to ½ inch prior to shaping, and the strip 2 may have a width of four to eight inches and a thickness in the range of 0.010 to 0.020 inches. Of course, the tube 1 and strip 2 may have other dimensions, but the strip 2 will normally have a width several times, e.g. at least ten times, the largest cross-sectional dimension of the tube 1 and many times the thickness of the strip 2.

The tube 1 and the strip 2 will be heated rapidly at their faying surfaces to a relatively high, welding temperature whereas portions of the strip 2 outwardly from, that is in directions extending away from, the tube 1 will not be heated to the welding temperature. As a result, the tube 1, the strip 2 and the weld metal therebetween shrink in length after cooling where the weld is formed and with respect to the portions of the strip 2 spaced outwardly from the weld. As mentioned hereinbefore the shrinkage may be in the range from 0.125% to 0.16%. Such shrinkage of the tube 1, the strip 2 and the weld metal causes buckling of the strip 2 outwardly of the tube 1 and causes the formation of random ripples 8 in portions of the strip 2 outwardly of the tube 1. Such buckling and the formation of ripples 8 has been found to be commercially undesirable for the reasons set forth hereinbefore.

To eliminate such ripples 8, the portions of the strip 2 outwardly of the tube 1 are foreshortened by mechanically indenting such portions without stretching the metal thereof by more than 2%. Normally, the indentations will extend from adjacent the tube 1 to the outward edges 2a and 2b of the strip 2, as illustrated in FIG. 4, and will be relatively uniform. Such indentations will be called corrugations herein although it will be understood that the indentations may be of a length and shape which is not necessarily normally included within the term "corrugations". In other words, the term "corrugations" is intended to include indentations in the strip 2 which in number, depth and spacing foreshorten the portions of the strip 2 outwardly of the tube 1 sufficiently to substantially eliminate the ripples 8 formed by the joining method without stretching the metal of such portions by more than 2%.

FIGS. 4 and 5 illustrate a regular pattern of corrugations 9, each of which, in cross-section, have an arcuate portion 9a and a substantially rectilinear portion 9b, and each corrugation 9 is joined to the adjacent corrugations 9 without interruption or spacing therebetween. Preferably, the number of corrugations is in the range of from one-and-one-half to six per inch and the depth thereof is such that the metal of the buckled portions of the strip 2 is not stretched by more than 2%. When the lengths of the corrugations 9 extend perpendicularly to the axis 10 of the tube 1, the length of the tube 1 between a pair of parallel lines passing through corresponding points on the corrugations 9 and extending perpendicular to the axis 10, e.g. the lines 11 and 12 (FIG. 8) which pass through the points 13 and 14 respectively, is substantially equal to the distance between such points 13 and 14. However, since the metal of the strip 2 nearer the tube 1 may also be heated to a temperature sufficient to cause shrinkage thereof with respect to the metal of the strip 2 at the outboard edges 2a and 2b thereof, it may not be necessary to foreshorten the metal nearer the tube 1 as much as the metal at or near the outboard edges 2a and 2b is foreshortened. Accordingly, the depth and shape of the corrugations 9 may vary along their lengths so as to accomplish the desired foreshortening.

The number, spacing and depth of the corrugations 9, in addition to being selected so that the metal of the strip 2 is not stretched more than 2%, is selected so that the developed length of the corrugated strip 2 of a heat exchange element comprising a tube 1 joined to a strip 2 (see FIG. 4) is not more than 2.5% larger than the length of the tube 1 joined to the strip 2. Thus, referring to FIG. 4, if the corrugated portions of the strip 2 are flattened and measured, the length thereof from the end 2c to the end 2d is not more than 2.5% larger than the length of the tube 1 from its end 1a to its end 1b.

As pointed out hereinbefore, the purpose of the corrugations 9 is to remove the ripples 8 and improve the appearance of the elements by themselves and when assembled in a panel as described and illustrated in said U.S. Pat. No. 4,136,272 and are not for other purposes, such as for preventing work hardening during use of the panel or for increasing heat absorption. Therefore, the corrugations may be very shallow and easily formed without damaging the strip 2, e.g. by tearing. However, such corrugations do stiffen the strip 2 and make it less likely that the strip 2 will be bent during handling of the element after it is formed.

Figure 7:
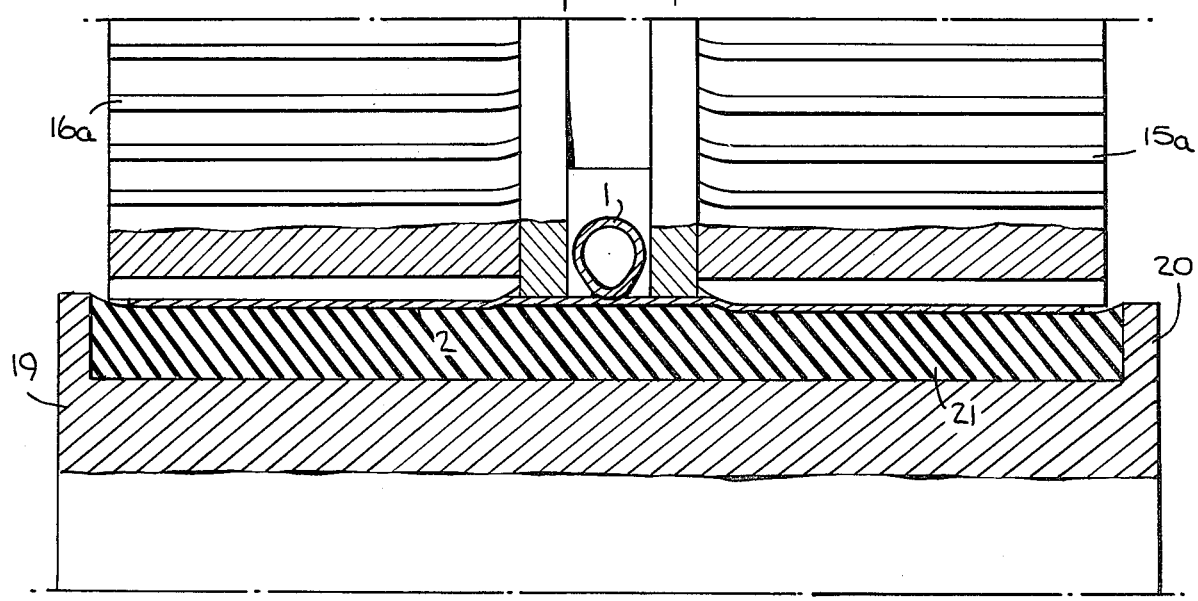
FIG. 7 is a fragmentary, enlarged, end elevation view of the apparatus illustrated in FIG. 6.

One simple form of apparatus for producing the corrugations 9 illustrated in FIGS. 4, 5 and 8 is shown diagrammatically in FIG. 1 and in greater detail in FIGS. 6 and 7. After the tube 1-strip 2 combination has sufficiently cooled, e.g. below 200° F., it is passed between a pair of gear-like rolls 15 and 16 and a roll 17. The rolls 15–17 may be driven by any conventional drive means, and the rolls 15 and 16 have a space 18 therebetween which permits the tube 1 to pass through the apparatus without deformation. The rolls 15 and 16 are made of metal, such as steel, and the roll 17 has metal ends 19 and 20 and an intermediate portion 21 made of a resilient material, such as polyurethane. The hardness of the portion 21 is selected so that the metal of the strip 2 is corrugated as it passes between the rolls 15 and 16 and the roll 17 in the direction of the arrow 22, the teeth 15a and 16a pressing the metal of the strip 2 into the portion 21. The teeth 15a and 16a form the substantially rectilinear portions 9b of the corrugations 9, and the arcuate portions 9a are formed by the material of the portion 21 which extends into the spaces between the teeth 15a and between the teeth 16a.

Figure 11:
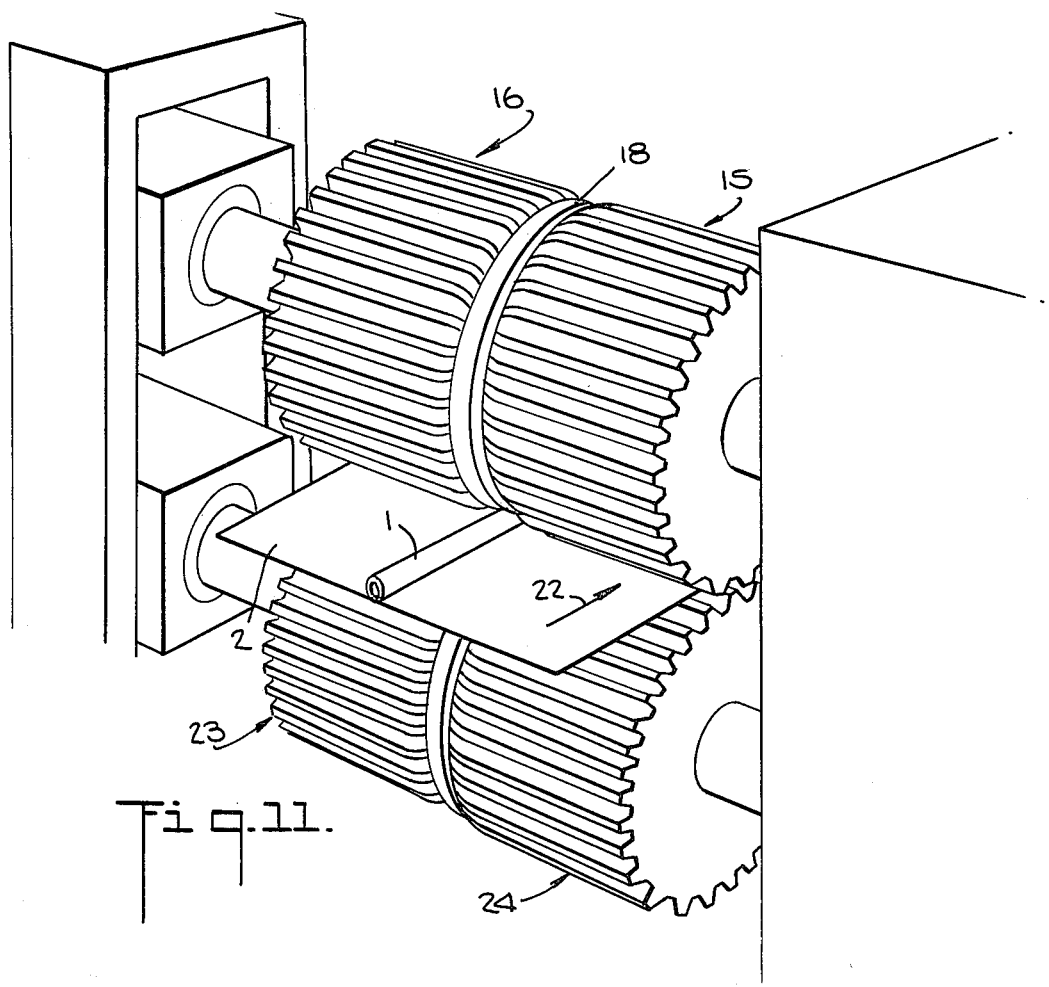
FIGS. 11 and 12 are, respectively, perspective and diagrammatic side elevation views of a further form of apparatus for corrugating the strip.
Figure 12:
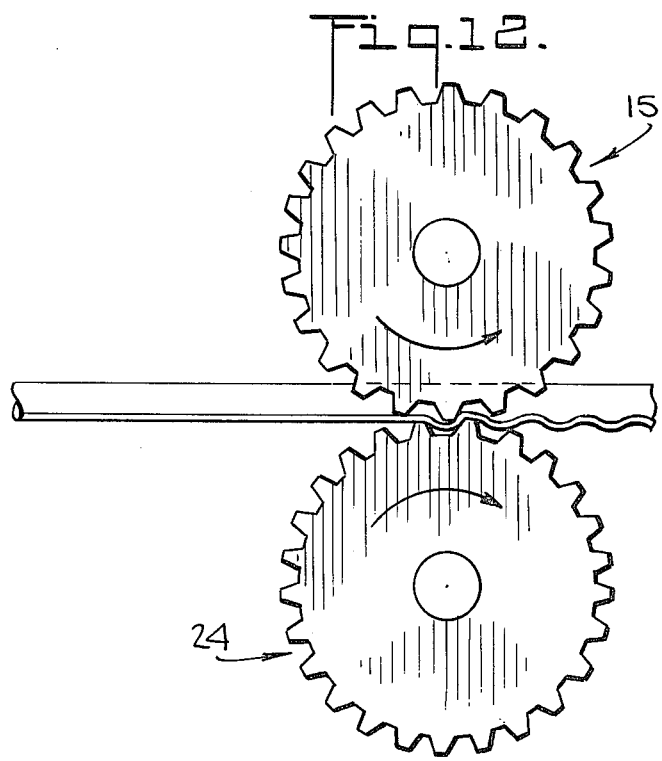

Another simple form of apparatus for producing corrugations in the strip 2 like the corrugations 9 is shown in FIGS. 11 and 12. The apparatus shown in FIGS. 11 and 12 is the same as, and is operated the same as, the apparatus shown in FIGS. 6 and 7 except that the lower roll 17 is replaced by a pair of gear-like rolls 23 and 24 similar to the rolls 15 and 16. The teeth of the rolls 23 and 24 are received between the teeth of the rolls 16 and 15 respectively, but the teeth of the rolls 23 and 24 are spaced from the teeth of the roll 16 and 15.

After the strip 2 is corrugated, the portions of the strip 2 adjacent to the ends of the tube 1 may be removed to permit the element to be easily assembled with a header. FIG. 8 illustrates one end of an element with such portions of the strip 2 removed. However, if desired, the ends of the tube 1 may be otherwise exposed, such as by machining away only end portions of the strip 2 immediately adjacent the tube ends and then bending the remainder of the strip ends out of the way.

In the embodiments of the invention described in connection with FIGS. 1–9, 11 and 12, the lengths of the corrugations 9 extend substantially perpendicularly to the axis 10 of the tube 1. If desired, the lengths of the corrugations 9 may extend at an acute angle to the axis 10 as illustrated in FIG. 10. Also, the corrugations may curve along their lengths instead of being rectilinear along their lengths as shown in FIGS. 8 and 10.

FIGS. 13–17 illustrate various cross-sectional shapes which the corrugations may have, the depth of the corrugations being exaggerated for purposes of illustration. Thus, in FIG. 13, the cross-section of the corrugations 25 has the shape of two oppositely opening arcuate portions, in FIG. 14, the cross-section of the corrugations 26 is similar to that of the corrugations 9, in FIG. 15, the cross-section of the corrugations 27 is substantially semi-circular, and in FIGS. 16 and 17, the cross-sections of the corrugations 28 and 29 comprise joined rectilinear portions.

In the embodiments described hereinbefore, a tube 1 having an inverted, tear-drop shape in cross-section is welded to the flat surface of a strip 2. The invention is also applicable to heat exchanger elements in which tubes of other cross-sections are formed and joined to a strip. The tube 1 may, for example be circular in cross-section if the current concentration obtained by shaping the tube 1 as described is not desired or necessary.

FIG. 18 illustrates a tube 30 of circular cross-section welded at 31 to a rib 32 extending above the major surface of a strip 33, the rib 32 providing the desired current concentration.

FIG. 19 illustrates a tube 34 of circular cross-section with a projecting rib 35 welded at 36 to the flat surface of the strip 2.

FIG. 20 illustrates a tube 37 of circular cross-section welded at 38 to a V-shaped rib 39 of a strip 40.

FIG. 21 illustrates a tube 41 formed by shaping a strip into a circular cross-section with overlapping and outwardly extending edges 42 and 43, the edges 42 and 43 being welded at 44 and 45 to the flat surface of the strip 2.

FIG. 22 illustrates a tube 46 formed from a strip and with its edges embracing the rib 32 of a strip 33, the edges of the tube 46 being welded to the rib 32 at 47 and 48.

FIG. 23 illustrates a tube-strip combination produced by forming a strip with a tubular portion 49 and outwardly extending portions 50 and 51, corresponding to the strip 2, and providing a weld at 52.

FIG. 24 illustrates a tube-strip combination produced by forming a U-shaped portion 53 and welding its edges at 54 and 55 to a strip 56 having a pair of V-shaped ribs 57 and 58.

FIG. 25 illustrates a tube 59 formed to have a modified, heart-shaped cross-section and welded at 60 and 61 to the flat surface of the strip 2.

FIG. 26 is similar to FIG. 24 but shows the U-shaped portion 53 welded at 62 and 63 to the flat surface of the strip 2.

FIG. 27 illustrates a strip 64 formed so as to have a pair of V-shaped ribs 66 and 67 and an intermediate U-shaped portion 68 which is covered by a flat strip 69 welded to the ribs 66 and 67 at 70 and 71. The strip 64 corresponds to the strip 2, and the portion 68 thereof with the cover 69 corresponds to the tube 1.

FIG. 28 illustrates a pair of strips 72 and 73 formed with a pair of semi-circular portions 74 and 75 adjacent one edge and welded together at 76 and 77 to form a tube joined at its sides to strips.

Although preferred embodiments of the present invention have been described and illustrated, it will be apparent to those skilled in the art that various modifications may be made without departing from the principles of the invention.

What is claimed is:

1. A heat exchanger element comprising a metal tube substantially continuously secured to a relatively wide and thin metal sheet intermediate its side edges by heated and cooled metal whereby the metal sheet tends to form ripples upon cooling, the width of said sheet being substantially greater than the cross-sectional dimension of the tube and the width dimension of said sheet extending transversely to the axis of said tube substantially within the plane of said sheet, said sheet having a plurality of corrugations therein at each side of said tube extending in a direction transverse to the axis of said tube, the corrugations stretching the metal sheet and extending from adjacent the tube to the side edges of said sheet, the corrugations extending from adjacent the tube to one of the side edges being spaced from the corrugations extending from adjacent the tube to the other of the side edges so as to leave uncorrugated metal of the sheet therebetween, the tube being continuously welded longitudinally thereof to said uncorrugated metal of the sheet and, the number, depth and spacing of such corrugations being selected to foreshorten said sheet at each side of said tube so that the length of the sheet between its ends is substantially equal to the length of said tube between its ends and so that the ripples in said sheet produced by the joining of said tube to said sheet are substantially eliminated and the developed length of the corrugated sheet due to such stretching being not more than 2.5% larger than said length of said tube.

2. A heat exchanger element as set forth in claim 1 wherein the number of said corrugations is in the range between one-and-one-half and six per inch and the depth thereof is such that the metal of said sheet is not stretched by more than 2%.

3. A heat exchanger element as set forth in claim 1 or 2 wherein said corrugations extend at right angles to the axis of said tube and the distance between corresponding points on said corrugations measured parallel to the axis of said tube is not greater than the length of said tube between two parallel lines extending perpendicularly to said axis of said tube and each of which intersects one of said points.

4. A heat exchanger element as set forth in claim 1 or 2 wherein said corrugations extend at an acute angle to the axis of said tube and the distance between corresponding points on said corrugations is not greater than the length of said tube between two parallel lines extending at said acute angle from the axis of said tube and each of which intersects one of said points.

5. A heat exchanger element as set forth in claim 1 or 2 wherein said corrugations have a regular pattern with each corrugation having substantially the same cross-section and joining adjacent corrugations without interruption.

6. A heat exchanger element as set forth in claim 5 wherein the cross-section of each corrugation is in the shape of interconnected rectilinear segments.

7. A heat exchanger element as set forth in claim 5 wherein at least a portion of the cross-section of each corrugation is arcuate in shape.

8. A heat exchanger element as set forth in claim 7 wherein a portion of the cross-section of each corrugation is arcuate in shape and the remainder thereof is substantially rectilinear.

* * * * *